US006725189B2

(12) United States Patent
Pett et al.

(10) Patent No.: US 6,725,189 B2
(45) Date of Patent: *Apr. 20, 2004

(54) ADAPTER FOR COUPLING A LEGACY OPERATING SYSTEM TO A DRIVER OF AN I/O CHANNEL WHICH HAS AN INCOMPATIBLE NATIVE OPERATING SYSTEM INTERFACE

(75) Inventors: Darrell Rex Pett, Elko, NV (US); Lewis Rossland Carlson, Salt Lake City, UT (US); Dennis Charles Gassman, Salt Lake City, UT (US)

(73) Assignee: Unisys Corporation, Blue Bell, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,948

(22) Filed: Apr. 22, 1999

(65) Prior Publication Data

US 2003/0135662 A1 Jul. 17, 2003

(51) Int. Cl.[7] .............................................. G06F 9/455
(52) U.S. Cl. .............................. 703/23; 703/24; 703/26; 709/211; 709/321; 711/207; 710/72; 714/53
(58) Field of Search ........................ 707/201; 709/201, 709/104, 229, 227, 400, 231, 226, 216, 321–328; 710/72, 240, 263, 62; 711/153, 207, 141, 168; 712/34; 714/11, 35, 53, 47; 717/138; 703/26, 23; 713/234

(56) References Cited

U.S. PATENT DOCUMENTS

| | | | | |
|---|---|---|---|---|
| 5,515,525 A | * | 5/1996 | Grynberg et al. | 703/27 |
| 5,590,313 A | * | 12/1996 | Reynolds et al. | 703/26 |
| 5,832,205 A | * | 11/1998 | Kelly et al. | 714/53 |
| 5,983,012 A | * | 11/1999 | Bianchi et al. | 703/23 |
| 6,006,029 A | * | 12/1999 | Bianchi et al. | 703/24 |
| 6,128,679 A | * | 10/2000 | Beale et al. | 710/62 |
| 6,199,152 B1 | * | 3/2001 | Kelly et al. | 711/207 |
| 6,209,023 B1 | * | 3/2001 | Dimitroff et al. | 709/211 |
| 6,351,782 B1 | * | 2/2002 | Eaves | 710/72 |

OTHER PUBLICATIONS

Chernoff et al., "FX!32 A Profile–directed binary translator", IEEE Micro, Mar./Apr., 1988.*
Jones, "Transparently interposing user code at the system interface", IEEE Proceedings of Third workshop on Workstation operating systems, Apr. 1992.*

* cited by examiner

Primary Examiner—Hugh Jones
Assistant Examiner—K Thangavelu
(74) Attorney, Agent, or Firm—Charles J. Fassbender; Mark T. Starr; Lise A. Rode

(57) ABSTRACT

An adapter program couples a legacy operating system to a driver program of an I/O channel which has an incompatible interface to a native operating system. The adapter program includes a translator which receives legacy control structures from the legacy operating system that represents a legacy I/O instruction. The adapter program also includes an interface to the driver program which simulates the native operating system interface. The adapter program further includes an emulator for performing the I/O instruction by interacting with the driver program thru the simulated native operating system interface.

9 Claims, 6 Drawing Sheets

FIG. 3

ScsiPortFlushDma
ScsiPortFreeDeviceBase
ScsiPortGetLogicalUnit
ScsiPortVirtualAddress
ScsiPortIoMapTransfer
ScsiPortReadPortBufferUchar
DbgBreakPoint
ExAllocatePoolWithTag
ExFreePool
InterlockedDecrement
InterlockedIncrement
IoAllocateAdapterChannel
IoAllocateErrorLogEntry
IoBuildAsychrononousFsdRequest
IoBuildDeviceIoControlRequest
IoBuildSynchronousFsdRequest
IoConnectInterrupt
IoCreateDevice
IoCreateSymbolicLink
IoDeleteDevice
IoDisconnectInterrupt
IoFreeIrp
IoFreeMdl
IoGetConfigurationInformation
IoInitializeTimer
IoQueryDeviceDescription
IoReportResourceUsage
IoStarNextPacket
IoStartPacket
IoStartTimer
IoStopTimer
IoWriteErrorLogEntry
IofCallDriver
IofCompleteRequest
KeCancelTimer
KeInitializeDeviceQueue
KeInitializeDpc
KeInitializeEvent
KeInitializeSpinLock
KeInitializeTimer
KeInsertByKeyDeviceQueue
KeInsertQueueDpc
KeRemoveByKeyDeviceQueue
KeRemoveDeviceQueue
KeSetTimer
KeSynchronizeExecution
KeWaitForSingleObject
KefAcquireSpinLockAtDpcLevel
DefReleaseSpinLockFromDepcLevel
MmMapIoSpace
MmMapLockedPages
MmUnlockPages
MmUnmapIoSpace
RtlAnsiStringToUnicodeString ★ScsiPortValidateRange
★ScsiPortReadRegisterUlong
★ScsiPortWriteRegisterUlong
★ScsiPortWritePortUlong
ScsiPortReadPortBufferUshort
ScsiPortReadPortBufferUlong
ScsiPortReadPortUshort
ScsiPortReadPortUlong
ScsiPortReadRegisterBufferUchar
ScsiPortReadRegisterBufferUshort
★ScsiPortReadRegisterBufferUlong
ScsiPortWritePortBufferUchar
ScsiPortWritePortBufferUshort
ScsiPortWritePortBufferUlong
ScsiPortWritePortUshort
★ScsiPortCompleteRequest
★ScsiPortGetBusData
★ScsiPortGetDeviceBase
★ScsiPortGetPhysicalAddress
★ScsiPortGetSrb
★ScsiPortGetUncachedExtension
★ScsiPortInitialize
★ScsiPortLogError
★ScsiPortMoveMemory
★ScsiPortNotification
ScsiportReadPortUnchar
★ScsiPortSetBusDataByOffset
ScsiPortWritePortUnchar
ExAcquireFastMutex
ExReleaseFastMutex
ExTryToAcquireFastMutex
HalAdjustResourceList
HalAllProcessorsStarted
HalAllocateAdapterChannel
HalAllocateCommonBuffer
HalBeginSystemInterrupt
HalCalibratePerformanceCounter
HalClearSoftwareInterrupt
HalDisableSystemInterrupt
HalDisplayString
HalEnableSystemInterrupt
HalEndSystemInterrupt
HalGetEnvironmentVariable
HalGetInterruptVector
HalHandleNMI
HalInitSystem
HalInitializeProcessor
HalProceessorIdle
HalQueryDisplayParametes
HalQueryRealTimeClock
HalReporResourceUsage
HalRequestIpi
HalRequestSoftwareInterrupt
HalReturnToFirmware
HalSetEnvironmentVariable
HalSetProfileInterval
HalSetRealTimeClock
★ScsiPortConvertPhysicalAddressToUlong
ScsiPortConvertUlongtoPhysicalAddress ScsiPortWriteRegisterBufferUchar
ScsiPortWriteRegisterBufferUshort
★ScsiPortWriteRegisterBufferUlong
★ScsiPortStallExecution
RtlAppendUnicodeStringToString
RtlCompareMemory
RtlCopyUnicodeString
RtlFreeUnicodeString
RtlInitAnsiString
RtlInitString
RtlInitUnicodeString
RtlIntegerToUnicodeString
RtlUnicodeStringToAnsiString
RtlUnwind
ZwClose
ZwCreteKey
ZeEnumerateValueKey
HalSetTimeIncrement
HalStartNextProcessor
HalStartProfileInterrupt
HalStopProfileInterrupt
HalSystemVectorDispatchEntry
HalTranslateBusAddress
IoAssignDriveLetters
IoReadPartitionTable
KdPortGetbyte
KdPortInitialize
KdPortPollByte
KdPortPutbyte
KdPortRestore
KdPortSave
KeAcquireSpinLockRaiseToSynch
KeFlushWriteBuffer
KeGetCurrentIrql
KeLowerIrql
KeQueryPerformanceCounter
KeRaiseIrql
KeRaiseIrqlToSynchLevel
KeStallExecutionProcessor
KfAcuireSpinLock
KfLowerIrql
KfRaiseIrql
KfReleaseSpinLock
ZwOpenKey
ZwQueryValueKey
ZwSetValueKey

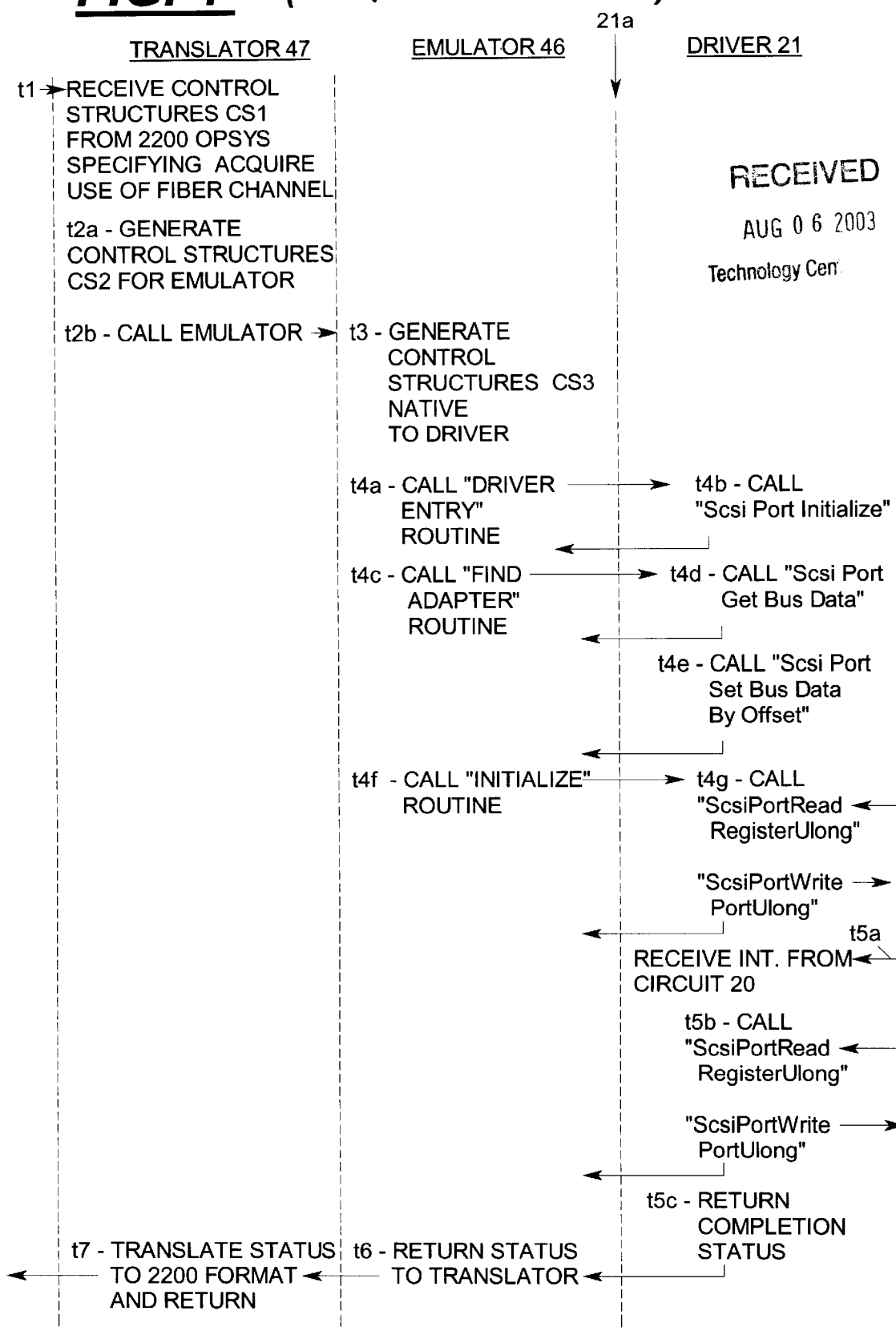
FIG. 4 (ACQUIRE FIBER CH)

FIG. 5 (ACQUIRE DEVICE)
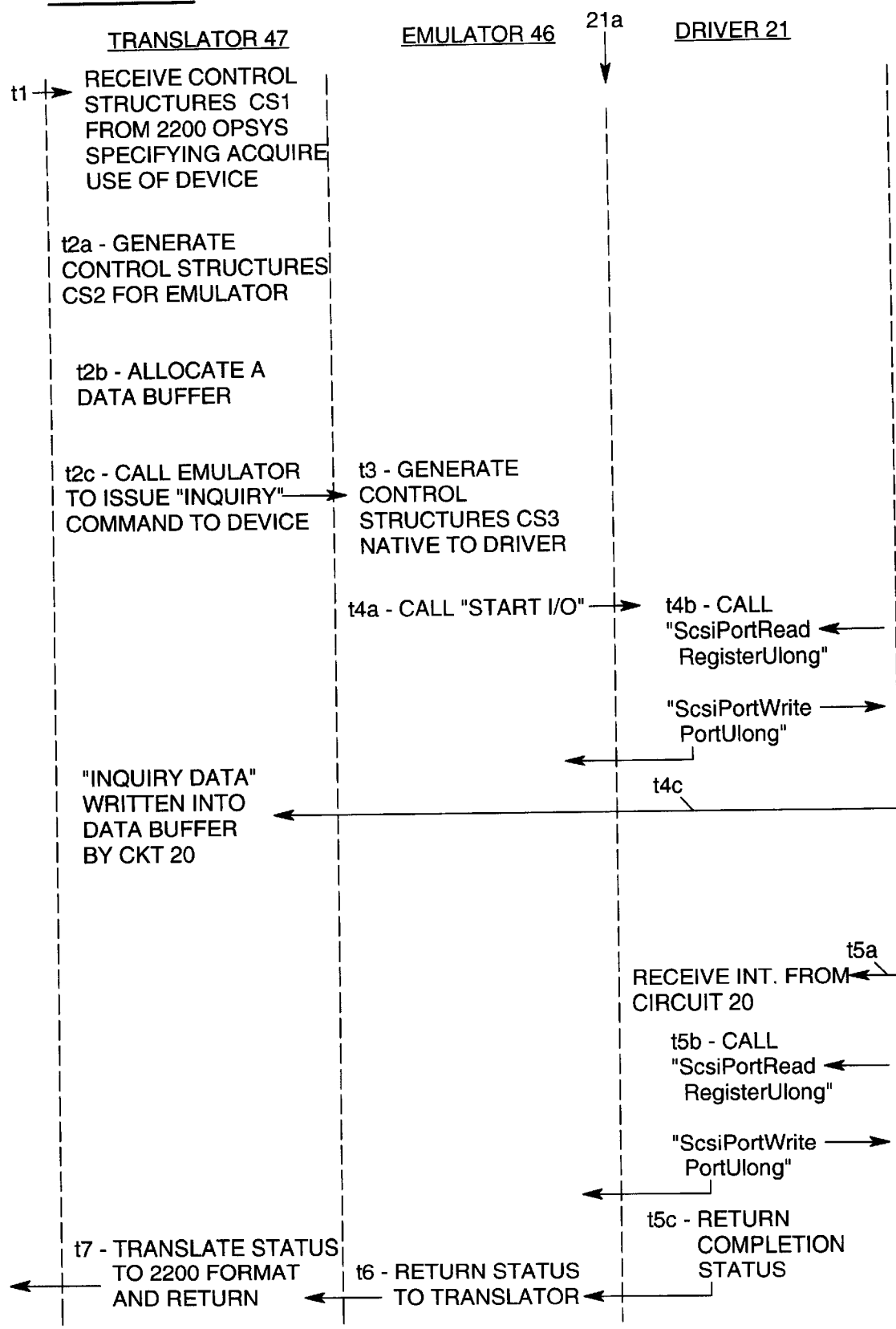

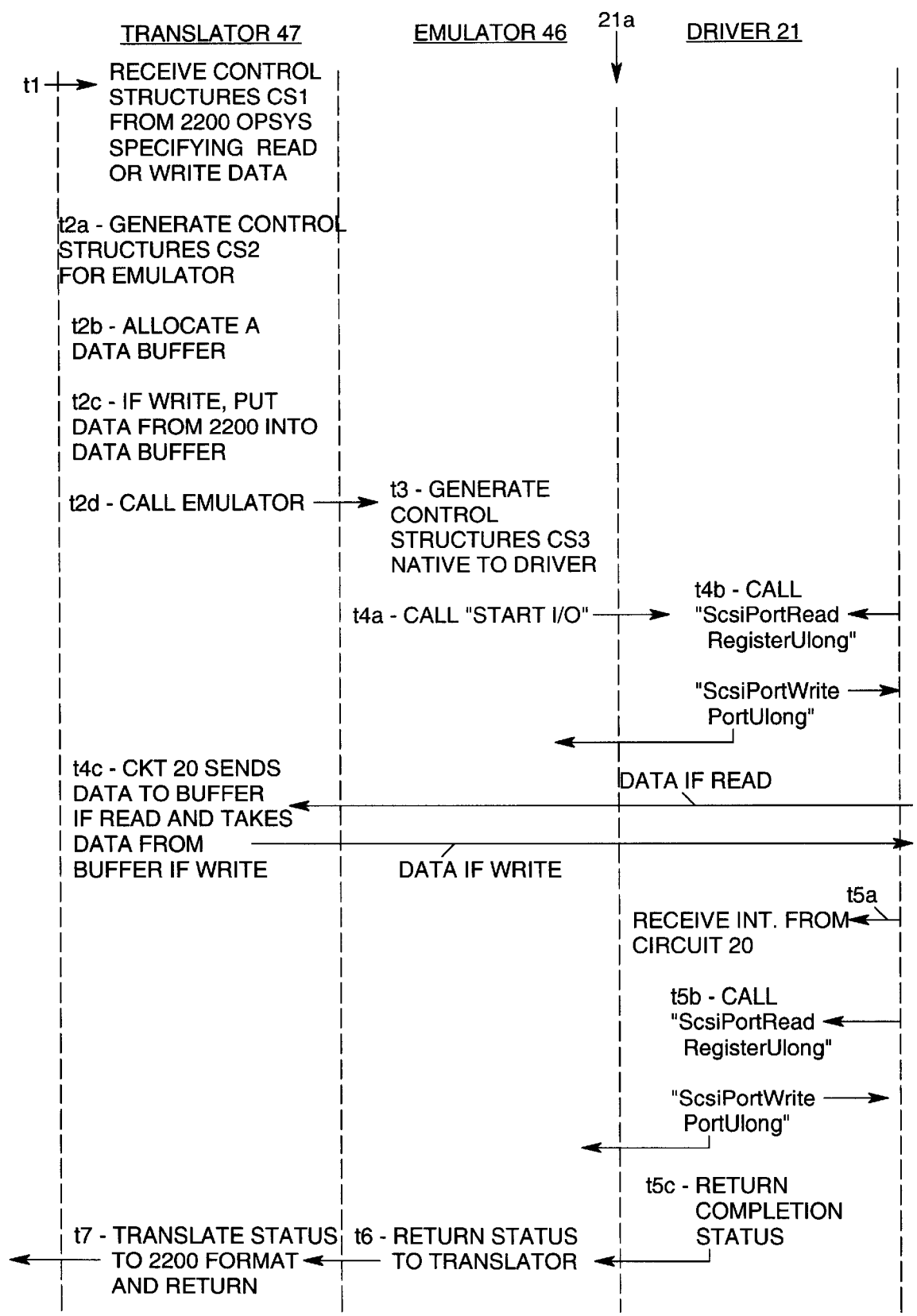
FIG. 6 (READ/WRITE)

ADAPTER FOR COUPLING A LEGACY OPERATING SYSTEM TO A DRIVER OF AN I/O CHANNEL WHICH HAS AN INCOMPATIBLE NATIVE OPERATING SYSTEM INTERFACE

BACKGROUND OF THE INVENTION

This invention relates to software driver programs which couple an I/O channel to an operating system for a digital computer.

An example of how an I/O channel is typically coupled in the prior art to an operating system for a digital computer, is shown in FIG. 1. In the FIG. 1 example, the I/O channel is a fiber channel which is indicated by reference numeral 10; and, the digital computer is an Intel X86 instruction processor which is indicated by reference numeral 11.

A semiconductor memory 12 is connected to the instruction processor 11 by an X86 bus 13; and stored within the memory 12 are several software programs. Program 14 in the memory 12 is a native operating system. Programs 15-1 thru 15-N are several different application programs which run under the control of the native operating system 14. In FIG. 1, the native operating system is shown as the Microsoft NT operating system, as an example.

Each application program includes one or more NT I/O instructions which interact with I/O devices on the fiber channel 10; and each such NT I/O instruction is sent to the NT operating system for execution. During that execution of an NT I/O instruction, two additional components 20 and 21 within the FIG. 1 system are used. Component 20 is an I/O circuit on a printed circuit board which connects the fiber channel 10 to the X86 bus 13; and component 21 is a native driver program which intercouples the I/O circuit 20 to the native operating system 14.

Typically, the I/O circuit 20 and the native driver program 21 are commodity items which are made by several manufacturers. By comparison, the native operating system 14 is a non-commodity item which is made by a single manufacturer. Each manufacturer of the I/O circuit 20 is forced to provide their own native driver program 21 with an interface 21a that is compatible with the native operating system 14, in order to sell their I/O circuit 20.

However, each manufacturer of the I/O circuit 20 only makes a corresponding native driver program 21 for those operating systems which are the most popular and in high use. Thus in the prior art, a manufacturer of an operating system which is unpopular had to write its own special purpose driver program in order to utilize the I/O circuit 20.

The above problem is faced, for example, by manufacturers of legacy instruction processors and legacy operating systems, which were very popular in the past but which lost their popularity over the years. One such legacy instruction processor is the 2200, and it has a legacy 2200 operating system. They are made and sold by Unisys Corporation.

In addition, the above problem is made worse due to the fact that the I/O circuit 20 frequently changes. These changes are made to reduce cost and to improve performance. Also, the changes are made to connect to new I/O channels, whenever they are defined.

To accommodate the above circuit changes with a legacy operating system, the corresponding special purpose driver program needs to be changed by the vendor of the legacy operating system. But changing the special purpose driver program, to match each change in the I/O circuit 20, is a large effort. Further, any change in the special purpose driver program is prone to errors that can show up after the driver is in a product that has been shipped to many customers.

Accordingly, a primary object of the present invention is to provide a solution to the above problems.

BRIEF SUMMARY OF THE INVENTION

In accordance with the present invention, a computer system is comprised of the following components: 1) a legacy instruction processor that executes a legacy I/O instruction under the control of a legacy operating system; 2) a native driver program, for an I/O circuit that connects to an I/O channel, which has a native operating system interface that is incompatible with the legacy operating system; and 3) an adapter program which is interposed between the native driver program and the legacy operating system.

In operation, the legacy operting system executes the legacy I/O instruction by sending control structures to the adapter program, but those control structures are in a format which is not recognized by the native driver program. To accommodate this mismatch, the adapter program has an interface to the native driver program which simulates the native operating system interface. Thru this simulated interface, the adapter program is able to perform the legacy I/O instruction by interacting with the native driver program.

One feature of the above computer system is that no special purpose driver program needs to be written for the legacy operating system. Instead, the adapter program has an interface which simulates the native operating system; and consequently, that interface will operate with the native driver program during the execution of the legacy I/O instruction from the legacy computer.

Another feature of the above computer system is that any changes to the I/O circuit which connects to the I/O channel are readily accommodated. Such changes are made to reduce cost, or improve performance, or connect to new I/O channels. But those I/O circuit changes have no effect on the native operating system interface which is simulated by the adapter program; and thus they have no effect on the adapter program.

BRIEF DESCRIPTION OF THE DRAWINGS

FIG. 3 shows several details of the native operating system interface that is simulated by an adapter program in FIG. 2.

FIG. 4 shows a sequence of steps that are performed by the adapter program of FIG. 2 during the execution of a legacy I/O instruction which acquires the use of the I/O channel.

FIG. 5 shows a sequence of steps that are performed by the adapter program of FIG. 2 during the execution of a legacy I/O instruction which acquires the use of a particular device on the I/O channel.

FIG. 6 shows a sequence of steps that are performed by the adapter program of FIG. 2 during the execution of a legacy I/O instruction which reads/writes data to the I/O device that was acquired in FIGS. 4 and 5.

DETAILED DESCRIPTION

With reference now to FIGS. 2–6, one preferred embodiment of the present invention will be described in detail.

Figure 2:
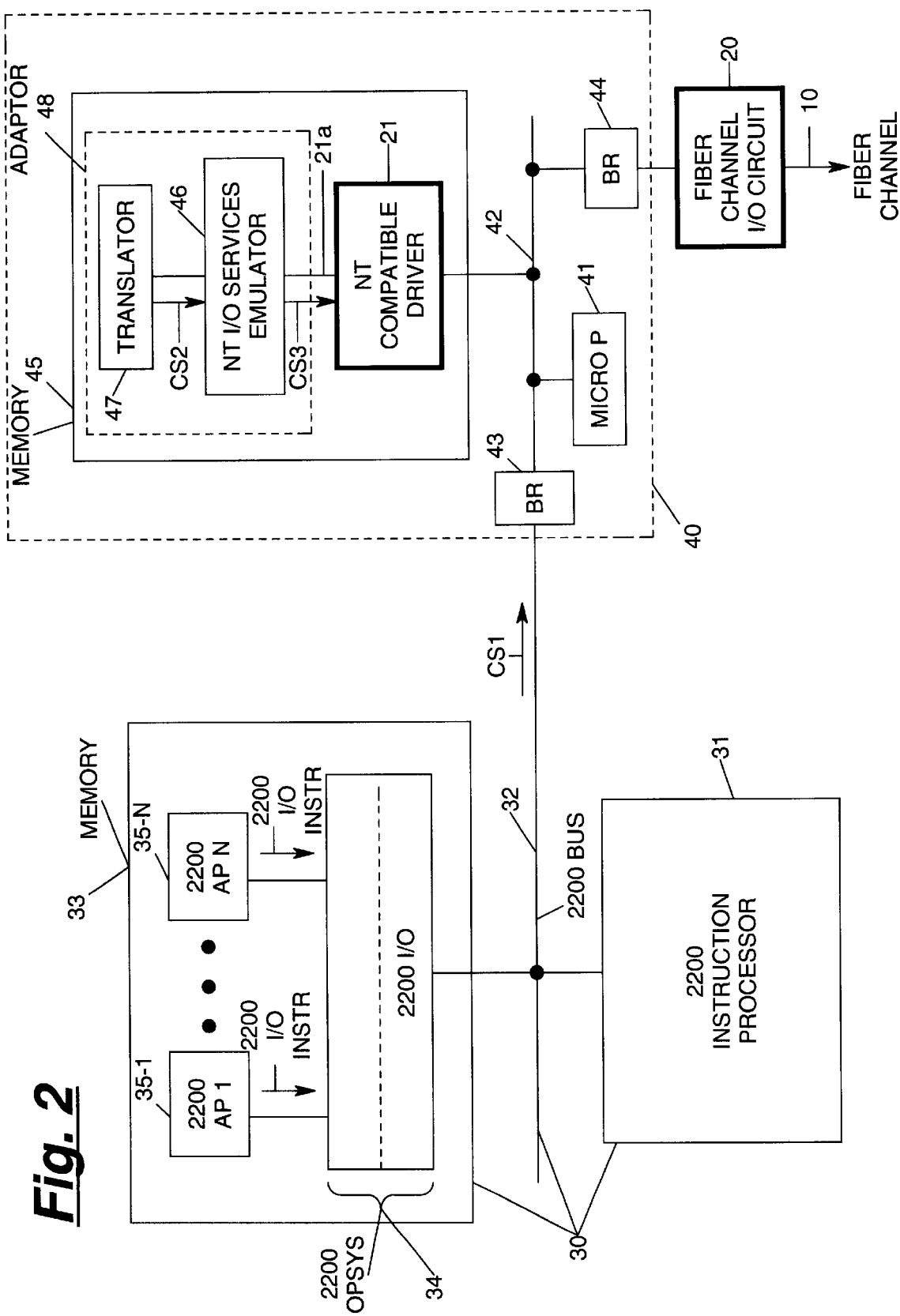
FIG. 2 shows how an I/O channel is coupled to a legacy operating system, in accordance with one embodiment of the present invention.

Beginning first with FIG. 2, it shows a legacy computer system 30 which is comprised of a 2200 instruction processor 31, a 2200 bus 32, and a semiconductor memory 33. Stored within the memory 33 is a 2200 operating system 34 and a plurality of 2200 application programs 35-1 thru 35-N which run under the operating system 34. All of the above components have been sold by Unisys Corporation for many years.

Figure 1:
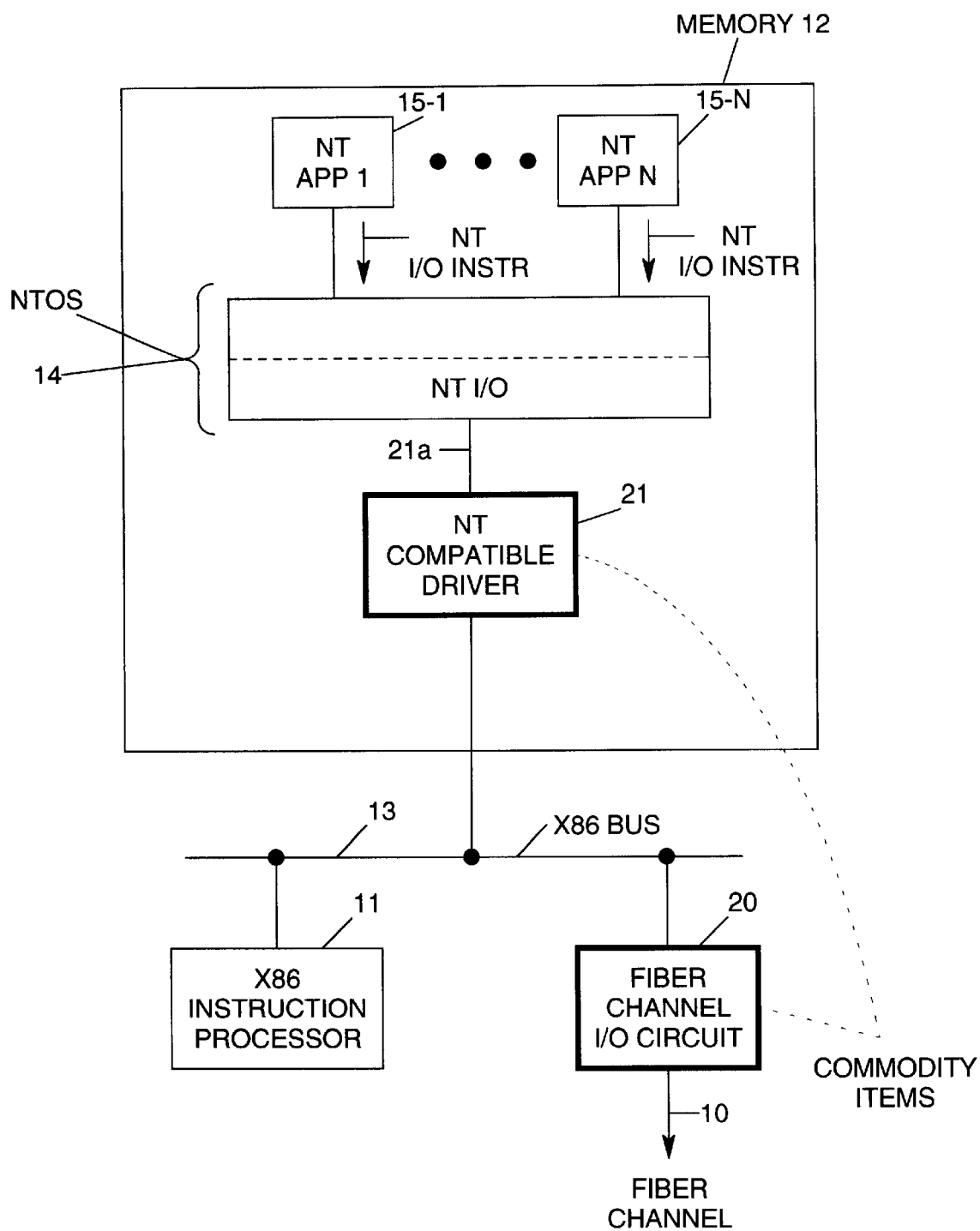
FIG. 1 shows an example of how an I/O channel is coupled to a native operating system, in the prior art.

Each of the application programs 35-1 thru 35-N includes one or more 2200 I/O instructions which interact with I/O devices (not shown) on the fiber channel 10. That fiber channel 10 in FIG. 2 is the same fiber channel which is shown in FIG. 1. Each 2200 I/O instruction is sent to the 2200 operating system 34 for execution; and in response, the 2200 operating system 34 sends control structures CS1 on the 2200 bus 32 to a module 40 which operates in accordance with the present invention.

Included in the module 40 are a microprocessor 41, a microprocessor bus 42, two bridge circuits 43 and 44, and a semiconductor memory 45. Bridge circuit 43 intercouples the 2200 bus 32 with the microprocessor bus 42; and bridge circuit 44 intercouples the microprocessor bus 42 with the fiber channel I/O circuit 20. This fiber channel I/O circuit 20 is the same I/O circuit 20 which is shown in FIG. 1.

Stored within the memory 45 are three programs, 46, 47, and 21. Program 21 in FIG. 2 is the same native driver program 21 that was described in conjunction with FIG. 1, which means they have the same source code. But, program 21 in FIG. 2 has been recompiled into instructions which are executed by the microprocessor 41. In one actual embodiment, the microprocessor 41 is a i960 microprocessor from Intel Corporation.

Program 46 is an emulator program, and program 47 is a translator program. These programs 46 and 47 constitute an adapter program 48 which enables the native driver program 21 to be used, without modifications, by the legacy computer system 30.

In operation, the translator program receives the control structures CS1 which are sent on the 2200 bus 32 by the 2200 operating system 34. Those control structures CS1 specify all of the tasks and parameters that are needed to perform a 2200 I/O instruction; however, they are in a format which is defined by the 2200 operating system and is completely foreign to the driver program 21.

When the translator 47 receives the control structure CS1, it generates a corresponding set of control structures CS2 for the emulator 46 which are predefined by the emulator. Those control structures CS2 are examined by the emulator 46; and in response, the emulator 46 interacts with the driver 21 in a manner which simulates the interface 21a of the native operating system 14 of the FIG. 1.

Through the simulated interface 21a, the adapter program 48 is able to perform the 2200 I/O instruction by using the native driver program 21 without modification. Various details of that simulated interface 21a are shown in FIG. 3.

In particular, each item in FIG. 3 is a support routine which is provided by the NT operating system 14 of FIG. 1; and each such support routine can be called by the driver program 21. When a support routine in FIG. 3 is called, it performs tasks which are defined in the MICROSOFT DEVELOPER NETWORK LIBRARY, (the MSDN™ LIBRARY). That library is used by the manufacturer of the I/O circuit 20 to develop their program 21 for their I/O circuit, and it is available from Microsoft on a C.D.

In order for the emulator 46 to simulate the native operating system 14, each support routine in FIG. 3 which is called by the driver 21 must be simulated. Simulating all of the support routines which are listed in FIG. 3 would be a huge effort. However, the driver programs from many of the manufacturers of the I/O circuit 20 actually call only a small subset of the support routines which are in the NT operating system 14. For example, in the driver program 21 for the fiber channel 10 which is sold by Emulex Corporation, only those support routines which are marked by an asterisk in FIG. 3 are actually called. Consequently, the task for the emulator 46 in FIG. 2 is greatly reduced.

Referring now to FIG. 4, it shows the details of how the translator 47, emulator 46, and driver 21 interact to perform a particular I/O instruction 11 from the 2200 computer. By this instruction 11, the 2200 computer attempts to acquire the use of the fiber channel 10.

Initially at time t1 in FIG. 4, the translator 47 receives control structures CS1 from the 2200 operating system 34. These control structures CS1 specify all of the tasks and parameters that are needed to perform the instruction 11, and they are in format F1 that is defined by the 2200 operating system 34.

When the translator 47 receives the control structures CS1, it generates a corresponding set of control structures CS2 for the emulator 46 which are in a format F2 that the emulator understands. Then at time t2b, the translator 47 calls the emulator 46 to perform the tasks which are specified by the control structures CS2.

In response to the call at time t2b, the emulator 46 generates another set of control structures CS3 which are native to the architectural requirements of the driver 21. This occurs at time t3. These control structures CS3 are in a format F3 which is defined by the NT operating system interface 21a, and they will be used by the driver 21 when it responds to three calls which the emulator 46 will make at times t4a, t4c and t4f.

Next at time t4a, the emulator 46 calls a "driver entry" routine within the driver 21. As a response at time t4b, the driver 21 calls "Scsi Port Initialize" routine within the emulator 46. Each of these called routines is defined by the NT operating system interface 21a. By those calls, signals are sent from the driver 21 to the emulator 46 which tell the emulator what I/O routines the driver uses from the list of FIG. 3 and tells the emulator how each such I/O routine can be accessed within the driver.

Next at time t4c, the emulator 46 calls a "find adapter routine" within the driver 21. In response at time t4d, the driver 21 calls a "Scsi Port Get Bus Data" routine within the emulator; and at time t4e, the driver calls a "Scsi Port Set Bus Data By Offset" routine within the emulator. Each of these called routines is defined by the NT operating system interface 21a. By these calls at times t4c, t4d and t4e, signals are sent from the emulator 46 to the driver 21 which enable the driver 21 to address the I/O circuit 20 on the microprocessor bus 42.

Next at time t4f, the emulator 46 calls a "initialize" routine within the driver 21. As a response at time t4g, the driver 21 calls a sequence of "ScsiPortReadRegisterUlong" and "ScsiPortwritePortUlong" routines which are within the emulator 46. Each of these called routines is defined by the NT operating system interface 21a. For each call to a "ScsiPortReadRegisterUlong" routine, the emulator 46 causes signals to be sent from the I/O circuit 20 to the driver 21; and for each call to a "ScsiPortwritePortUlong" routine, the emulator 46 causes signals to be sent from the driver 21 to the I/O circuit 20. These signals which are sent at times t4f and t4g enable the I/O circuit 20 to transmit and receive on the fiber channel 10.

Thereafter, at time t5a, the driver 21 receives an interrupt from the I/O circuit 20. This interrupt indicates that the I/O circuit 20 has a status to report regarding the success or failure of the calls which occurred at time t4g. To obtain that status, the driver at time t5b calls a sequence of "ScsiPortReadRegisterUlong" and "ScsiPortwritePortUlong" routines; and then at time t5c, the driver 21 sends the status to the emulator 46. Next at time t6, the status is sent from the emulator 46 to the translator 47. Then at time t7, the translator 47 reformats the status into a form which is recognized by the 2200 computer; and it returns that reformatted status to the 2200.

Considering next FIG. 5, it shows the details of how the translator 47, emulator 46, and driver 21 interact to perform another I/O instruction 12 from the 2200 computer. By this instruction 12, the 2200 computer attempts to acquire the use of a particular I/0 device D(i) that is attached to the fiber channel. At any one time, the total number of I/O devices which can be attached to the fiber channel is over one-hundred; so device D(i) is not shown in the figures.

Initially at time t1 in FIG. 5, the translator 47 receives the control structures CS1 from the 2200 operating system 34. Here again, these control structures CS1 specify all of the tasks and parameters that are needed to perform the instruction 12, and they are in format F1 that is defined by the 2200 operating system 34.

In response at time t2a, the translator generates the corresponding set of control structures CS2 for the emulator 46 which are in the format F2 that the emulator understands. Next, at time t2b, the translator establishes a data buffer in the memory 45 for use in performing the instruction 12. Then, at time t2c, the translator 47 calls the emulator 46 to perform the tasks which are specified by the control structures CS2.

In response to the call at time t2c, the emulator 46 generates the control structures CS3 which are defined by the NT operating system interface 21a and are recognized by the driver 21. This occurs at time t3. These control structures CS3 include a "SCSI Request Block" (SRB), and they include an "INQUIRY" command for the particular I/O device D(i). These control structures CS3 will be used by the driver 21 when it responds to a call which the emulator will make at time t4a.

Next, at time t4a, the emulator calls a "start I/O" routine within the driver 21; and that causes the driver 21 to execute the INQUIRY command, beginning at time t4b. During the execution of the INQUIRY command, the driver 21 calls a sequence of "ScsiPortReadRegisterUlong" and "ScsiPortwritePortUlong" routines which are within the emulator 46. Each of these called routines is defined by the NT operating system 21a. Each call to a "ScsiPortReadRegisterUlong" routine causes signals to be sent from the I/O device D(i) on the fiber channel into the emulator, and each "ScsiPortwritePortUlong" routine causes signals to be sent from the emulator to the I/O device D(i) on the fiber channel.

Next at time t4c, the I/O device D(i) writes "inquiry data" into the data buffer that was established at time t2b. This "inquiry data" is sent in response to the calls which are made at time t4b; and it can be analyzed by the 2200 computer to determine whether or not the 2200 can successfully communicate with the selected device on the fiber channel.

Thereafter at time t5a, the driver 21 receives an interrupt from the I/O circuit 20 which indicates that the inquiry data has been written into the data buffer. In response at time t5b, the driver 21 calls a sequence of "ScsiPortReadRegisterUlong" and "ScsiPortwritePortUlong" routines to thereby obtain a status report on the success or failure of the calls which occurred at time t4b. Next, at times t5c and t6, the status is sent from the I/O circuit 20 through the emulator 46 to the translator 47. Then at time t7, the translator 47 reformats the status into a form which is recognized by the 2200 computer and returns the reformatted status to the 2200.

Turning now to FIG. 6, it shows the details of how the translator 47, emulator 46, and driver 21 interact to perform two more I/O instructions 13 and 14 from the 2200 computer. By the instruction 13, data is read from I/O device D(i) that was acquired by the instructions 11 and 12 in FIGS. 5 and 6; and by the 14 instruction, data is written to the I/O device D(i).

Initially, at time t1 in FIG. 6, the translator 47 receives the control structures CS1 from the 2200 operating system 34 which specify all of the tasks and parameters that are needed to perform the instruction 13 or the instruction 14. These control structures CS1 are in the format F1 that is defined by the 2200 operating system 34.

In response at time t2a, the translator 47 generates the corresponding set of control structures CS2 for the emulator 46 which are in the format F2 that the emulator understands. Then at time t2b, the translator 47 establishes a data buffer in the memory 45 for use in performing the instruction 13 or 14. If the 2200 instruction is 13 (Write), then the data buffer is loaded at time t2c with data from the 2200 computer that is to be sent to the I/O device D(i). Then at time t2d, the translator 47 calls the emulator 46.

In response to the call at time t2d, the emulator 46 generates the control structures CS3 which are defined in the NT operating system interface 21a and are recognized by the driver 21. These control structures CS3 include the SCSI Request Block (SRB), and they are generated at time t3. The control structures CS3 will be used by the driver 21 when it responds to a call which the emulator will make at time t4a.

Next at time t4a, the emulator 46 calls a "start I/O" routine within the driver 21. That causes the driver 21 to examine the SRB and thereby determine whether a read or a write operation is to occur with the I/O device D(i). Then at time t4b, the driver 21 responds by calling a sequence of "ScsiPortReadRegisterUlong" and "ScsiPortwritePortUlong" routines. Each call to a "ScsiPortReadRegisterUlong" routine causes signals to be sent from the I/O device D(i) to the emulator 46; and each call to a "ScsiPortwritePortUlong" routine causes signals to be sent from the emulator 46 to the I/O device D(i).

Next, at time t4c, the transfer of data begins to occur between the I/O device D(i) and the data buffer that was established at time t2b. This transfer of data occurs in response to the calls which were made at time t2b. If the instruction 13 is being performed, then the I/O device D(i) sends data to the I/O circuit 21 which in turn stores that data into the data buffer. Conversely if the instruction 14 is being performed, then the I/O circuit 20 takes data from the data buffer and sends it to the I/O device D(i).

After the above data transfer is completed, the driver 21 receives an interrupt from the I/O circuit 20. This occurs at time t5a. Then at time t5b, the driver 21 calls a sequence of "ScsiPortReadRegisterUlong" and "ScsiPortwritePortUlong" routines to thereby obtain a status report from the I/O circuit 20 on the success or failure of the data transfer which occurred at time t4c. Next at times t5c and t6, the status is sent from the I/O circuit 20 through the emulator 46 to the translator 47. Then at time t7, the translator 47 reformats the status into a form which is recognized by the 2200 computer and returns the reformatted status to the 2200.

One particular feature of the above-described computer system of FIGS. 2–6 is that no special purpose driver program needs to be written for the 2200 operating system 34. This feature occurs because the adapter program 48 has an interface 21a which simulates the interface of the native NT operating system 14 of FIG. 1. Consequently, the native driver program 21 will operate with the adapter program 48 during the execution of I/O instructions from the legacy 2200 operating system.

Another feature of the above-described computer system of FIGS. 2–6 is that any changes to the I/O circuit 20 are readily accommodated. Such changes are made to reduce costs, or improve performance, or connect to different I/O channels. Those I/O circuit changes have no effect on the native operating system interface 21a which is simulated by the adapter program 48; and thus they have no effect on the adapter program 48.

A preferred embodiment of the present invention has now been described in detail. In addition however, various changes and modifications can be made to the details of the illustrated preferred embodiment without departing from the nature and spirit of the invention.

For example, as one modification, the driver program 21 in FIG. 2 is not limited to a driver program for the fiber channel 10. Instead, the driver program 21 can be a driver for any type of I/O channel, such as an Ethernet channel or a SCSI channel.

As another modification, the interface 21a in FIG. 2 between the driver program 21 and the emulator 46 is not limited to an interface that is defined by the Microsoft NT operating system. Instead, that interface 21a which is simulated by the emulator 46 can be defined by any operating system which is compatible with the driver 21. For example, the interface 21a can be defined by the Netware operating system or by any version of the UNIX system. Two common versions of the UNIX operating system are called AIX (from IBM Corporation), and called Solaris (from Sun Corporation).

As another modification, the legacy instruction processor 31 and legacy operating system 34 in FIG. 2 are not limited to the 2200 instruction processor and 2200 operating system. Instead, the instruction processor 31 and operating system 34 can be any instruction processor and any operating system for which the driver program 21 is incompatible. For example, the instruction processor 31 and operating system 34 can be an A-Series instruction processor and A-Series operating system from Unisys Corporation.

As another modification, the adapter program 48 of FIG. 2 need not be stored in the semiconductor memory 45 which is coupled by the bus 42 to the microprocessor 41. Instead, the adapter program 48 can be stored in any other type of program storage memory which is readable directly or indirectly by the microprocessor 41, such as a magnetic disk or an optical CD.

Accordingly, since many such modifications to the illustrated preferred embodiment can be made, it is to be understood that the invention is not limited to just the details of the illustrated preferred embodiment, but is defined by the appended claims.

What is claimed is:

1. An adapter program in a program storage memory that is readable by a computer, for coupling a legacy operating system to a driver program of an I/O channel, where said driver program has an interface to a native operating system which is incompatible with said legacy operating system and where said native operating system includes a full set of native support routines which perform tasks for said driver program when called by said driver program;

said adapter program including a translator which receives a legacy control structure from said legacy operating system, that represents a legacy I/O instruction, and generates a different control structure in response;

said adapter program also including an emulator having a) an interface to said driver program which is bi-directional, and b) simulated support routines which simulate only a small subset of said native support routines in said full set; and, said emulator further including steps for performing said I/O instruction by a) calling an external routine in said driver program thru said bi-directional interface in response to said different control structure, b) receiving a call back from said driver program thru said bi-directional interface as a response to said calling of said external routine which identifies one native support routine in said small subset, and c) immediately executing a simulated support routine which simulates said one native support routine, without sending any result to said native operating system, in response to said call back from said driver program.

2. An adapter program according to claim 1 wherein said simulated support routines simulate less than half of said native support routines which are in said full set.

3. An adapter program according to claim 2 wherein said native support routines are defined by a Microsoft NT operating system.

4. An adapter program according to claim 2 wherein said native support routines are defined by a UNIX operating system.

5. An adapter program according to claim 2 wherein said legacy operating system is a 2200 operating system.

6. An adapter program according to claim 2 wherein said legacy operating system is an A-Series operating system.

7. An adapter program according to claim 2 wherein said driver program is a driver for a fiber channel.

8. An adapter program according to claim 2 wherein said driver program is a driver for a SCSI channel.

9. An adapter program according to claim 2 wherein said driver program is a driver for an Ethernet channel.

* * * * *